(12) United States Patent
Yokota et al.

(10) Patent No.: US 11,244,265 B2
(45) Date of Patent: Feb. 8, 2022

(54) MAINTENANCE OPERATION SUPPORT DEVICE, MAINTENANCE OPERATION SUPPORT METHOD, AND NON-TRANSITORY COMPUTER READABLE STORAGE MEDIUM

(71) Applicant: Yokogawa Electric Corporation, Musashino (JP)

(72) Inventors: Yusuke Yokota, Tokyo (JP); Ryouhei Furihata, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 207 days.

(21) Appl. No.: 15/865,329

(22) Filed: Jan. 9, 2018

(65) Prior Publication Data
US 2018/0204165 A1 Jul. 19, 2018

(30) Foreign Application Priority Data
Jan. 18, 2017 (JP) .............................. JP2017-006887

(51) Int. Cl.
| | |
|---|---|
| *G06Q 10/06* | (2012.01) |
| *G06F 16/44* | (2019.01) |
| *G06F 16/907* | (2019.01) |
| *F16K 11/10* | (2006.01) |
| *G06Q 10/00* | (2012.01) |
| *G05B 19/418* | (2006.01) |
| *G06Q 50/04* | (2012.01) |

(Continued)

(52) U.S. Cl.
CPC ...... *G06Q 10/06316* (2013.01); *F16K 11/105* (2013.01); *G05B 19/418* (2013.01); *G05B 19/41865* (2013.01); *G06F 3/0488* (2013.01); *G06F 16/44* (2019.01); *G06F 16/907* (2019.01); *G06Q 10/20* (2013.01); *G06Q 50/04* (2013.01); *G06Q 50/06* (2013.01); *Y02P 90/02* (2015.11); *Y02P 90/30* (2015.11); *Y02P 90/80* (2015.11)

(58) Field of Classification Search
CPC .. G06Q 10/06316; G06F 16/44; G06F 16/907
See application file for complete search history.

(56) References Cited

U.S. PATENT DOCUMENTS

| | | | | |
|---|---|---|---|---|
| 6,356,437 B1* | 3/2002 | Mitchell | ................. | G06F 1/163 342/352 |
| 2004/0181549 A1* | 9/2004 | Pate | ..................... | G05B 23/027 707/999.107 |

(Continued)

FOREIGN PATENT DOCUMENTS

| | | |
|---|---|---|
| GB | 2513709 A | 11/2014 |
| JP | 2003186532 A | 7/2003 |

(Continued)

*Primary Examiner* — Kannan Shanmugasundaram
(74) *Attorney, Agent, or Firm* — Sughrue Mion, PLLC

(57) ABSTRACT

A maintenance operation support device includes a procedure information outputter configured to output procedure information representing an operation procedure of maintenance operations for a facility, the procedure information being obtained by combining action definition information for defining actions of a setting tool that adjusts or sets the facility and operation definition information for defining operations to be instructed to a maintenance operator who performs the maintenance operations for the facility.

15 Claims, 12 Drawing Sheets

(51) Int. Cl.
*G06Q 50/06* (2012.01)
*G06F 3/0488* (2013.01)

(56) References Cited

U.S. PATENT DOCUMENTS

| | | | |
|---|---|---|---|
| 2009/0106227 A1* | 4/2009 | Davis | G06Q 10/06 |
| | | | 707/999.005 |
| 2013/0311243 A1 | 11/2013 | Taki et al. | |
| 2014/0315159 A1* | 10/2014 | Mukherjee | G06Q 10/103 |
| | | | 434/107 |
| 2015/0062624 A1* | 3/2015 | Ishikura | B41J 29/38 |
| | | | 358/1.15 |
| 2015/0355631 A1 | 12/2015 | Ochiai | |

FOREIGN PATENT DOCUMENTS

| | | |
|---|---|---|
| JP | 2010-176499 A | 8/2010 |
| JP | 2014-089586 A | 5/2014 |
| JP | 2015-230538 A | 12/2015 |
| JP | 2016071582 A | 5/2016 |

* cited by examiner

FIG. 4A

[CONTENT ☑]

FIG. 4B

```
COMPLETION
CONTENT ☑  THREE-WAY VALVE OPERATION
                                    OK
```

FIG. 5A

[ACQUIRE VALUE ⇦ 🖥]

FIG. 5B

```
DATA ACQUISITION
To         FI-1001(EJX)
PARAMETER  PV
                              OK
```

FIG. 5C

```
DATA ACQUISITION RESULT
From       FI-1001(EJX)
PARAMETER  PV
DATA       20.4KPA
STATUS     SUCCESS
                              OK
```

FIG. 6A
FIG. 6B
| DATA WRITING | |
|---|---|
| To | FI-1001(EJX) |
| PARAMETER | LRV |
| DATA | 0.0KPA |
| | OK |
FIG. 6C
| DATA WRITING RESULT | |
|---|---|
| From | FI-1001(EJX) |
| PARAMETER | LRV |
| DATA | 0.0KPA |
| STATUS | SUCCESS |
| | OK |
FIG. 7A
FIG. 7B
| AP ACTIVATION | |
|---|---|
| To | MAINTENANCE DEVICE 1 |
| AP NAME | FieldMate |
| ARGUMENT | |
| | OK |

FIG. 8A
FIG. 8B
| QUESTIONNAIRE | |
|---|---|
| COMMENT | READJUSTMENT IS NECESSARY |
| | OK |
FIG. 9A
FIG. 9B
| STANDBY | |
|---|---|
| TIME | 60 SECONDS |
| | OK |
FIG. 10A
FIG. 10B

FIG. 11A
FIG. 11B
FIG. 11C

FIG. 16

| ITEM | CONTENT | TARGET | COMPLETION | |
|---|---|---|---|---|
| REQUEST (TRANSMIT) | PERMISSION FOR OPERATION | OPERATOR | | ☑ |
| REQUEST (TRANSMIT) | PERMISSION FOR OPERATION | OPERATOR | | ☑ |
| NOTIFICATION | NOTICE OF START OF OPERATION | OPERATOR AND PANEL OPERATOR | | ☑ |
| COMPLETION | CONNECTION OF MAINTENANCE DEVICE | OPERATION TARGET | | ☑ |
| REQUEST (TRANSMIT) | CHECK CURRENT VALUE | OPERATOR AND PANEL OPERATOR | | ☑ |
| DATA ACQUISITION | CHECK CURRENT VALUE | OPERATION TARGET | ☑ | ☑ |
| REQUEST (RECEIVE) | CHECK CURRENT VALUE | OPERATOR AND PANEL OPERATOR | ☑ | |
| COMPLETION | THREE-WAY VALVE OPERATION (ZERO STATE) | THREE-WAY VALVE | | ☑ |
| WRITE DATA | ZERO-POINT ADJUSTMENT | OPERATION TARGET | | ☑ |
| REQUEST (TRANSMIT) | CHECK CURRENT VALUE | OPERATOR AND PANEL OPERATOR | | ☑ |
| DATA ACQUISITION | CHECK CURRENT VALUE | OPERATION TARGET | ☑ | ☐ |
| REQUEST (RECEIVE) | CHECK CURRENT VALUE | OPERATOR AND PANEL OPERATOR | ☐ | |
| COMPLETION | THREE-WAY VALVE OPERATION (PROCESS RESTORATION) | THREE-WAY VALVE | | ☐ |
| COMPLETION | REMOVE MAINTENANCE DEVICE | OPERATION TARGET | | ☐ |
| NOTIFICATION | NOTICE OF START OF OPERATION | OPERATOR AND PANEL OPERATOR | | ☐ |

MAINTENANCE OPERATION SUPPORT DEVICE, MAINTENANCE OPERATION SUPPORT METHOD, AND NON-TRANSITORY COMPUTER READABLE STORAGE MEDIUM

BACKGROUND

Technical Fields

The present invention relates to a maintenance operation support device, a maintenance operation support method, and a non-transitory computer readable storage medium.

Priority is claimed on Japanese Patent Application No. 2017-006887, filed Jan. 18, 2017, the contents of which are incorporated herein by reference.

Related Art

In plants such as chemical industry plants or the like, a plant that manages and controls a well site of a gas field, an oil field, or the like and the surroundings thereof, a plant that manages and controls hydroelectric power generation, thermal power generation, and nuclear power generation, or the like, a plant that manages and controls environmental power generation such as solar power generation and wind power generation, or the like, a plant that manages and controls water supply and sewerage, a dam, or the like and factories (hereinafter, in a case in which these are collectively referred to, they will be referred to as "plants"), distributed control systems (DCS) have been constructed, and high-level automatic operations have been realized. In a DCS, field devices such as a measuring instrument, an operation device, and the like and a control apparatus controlling these are connected through a communicating means. In a plant in which such a distributed control system is created, from a viewpoint of prevention of abnormal operations and maintenance of measurement accuracy, maintenance of field devices (hereinafter sometimes abbreviated to as "devices") by a maintenance operator is performed periodically or non-periodically.

In maintenance of field devices, various types of maintenance operation are performed depending on a field device or the like. In some maintenance operations, a maintenance operator, for example, performs predetermined maintenance operations sequentially while checking an operation manual, a checklist, or instructions and the like from another maintenance operator or a maintenance manager who manages maintenance operations. The maintenance operator determines the state of a field device and an alarm occurrence state on the basis of the content described in the operation manual or the like and manually performs the maintenance operations sequentially. Moreover, the maintenance operator manually performs maintenance operations sequentially while establishing contact with a maintenance manager or the like via a transceiver or by email to get approval for starting or ending a maintenance operation, receive instructions regarding the details of the operation, or report completion of the operation. As a device that supports a manual maintenance operation, a device that automatically generates an operation manual of which the content is different depending on the skill of a maintenance operator and displays the generated operation manual to a maintenance operator is known (for example, see Japanese Unexamined Patent Application Publication No. 2014-089586).

Some maintenance operations use a maintenance device capable of automatically executing a maintenance operation for a field device. The maintenance operator connects the maintenance device to a maintenance target field device to perform a maintenance operation. As an example of a device that supports an automated maintenance operation, a maintenance device that communicates with a field device via cables or wirelessly to automatically execute a maintenance operation such as setting of parameters of the field device is known (for example, see Japanese Unexamined Patent Application Publication No. 2015-230538).

For some maintenance operations, a maintenance operator may perform a maintenance operation while establishing contact with another maintenance operator or a maintenance manager who manages the maintenance operation. The maintenance operator establishes contact with a maintenance manager or the like using a transceiver or an email, for example, to get approval for starting or ending a maintenance operation, receive an instruction on the details of the operation, or report completion of the operation.

However, in a device that supports a manual maintenance operation, since it may not be possible to execute an automated maintenance operation for a field device, there are cases in which it is not possible to reduce the number of errors in a procedure of operations including an automated maintenance operation.

On the other hand, in a device that supports an automated maintenance operation, since it may not be possible to execute a manual maintenance operation such as an operation of operating valves or an operation of establishing contact using a transceiver, there are cases in which it is not possible to reduce a mistake in a procedure of operations including a manual maintenance operation.

SUMMARY

A maintenance operation support device may include a procedure information outputter configured to output procedure information representing an operation procedure of maintenance operations for a facility, the procedure information being obtained by combining action definition information for defining actions of a setting tool that adjusts or sets the facility and operation definition information for defining operations to be instructed to a maintenance operator who performs the maintenance operations for the facility.

Further features and aspects of the present disclosure will become apparent from the following detailed description of exemplary embodiments with reference to the attached drawings.

BRIEF DESCRIPTION OF THE DRAWINGS

FIGS. 4A and 4B are diagrams illustrating an example of operation definition information of the maintenance operation support device according to the embodiment.

FIGS. 5A to 5C are diagrams illustrating an example of action definition information of the maintenance operation support device according to the embodiment.

FIGS. 6A to 6C are diagrams illustrating an example of action definition information of the maintenance operation support device according to the embodiment.

FIGS. 7A and 7B are diagrams illustrating an example of action definition information of the maintenance operation support device according to the embodiment.

FIGS. 8A and 8B are diagrams illustrating an example of operation definition information of the maintenance operation support device according to the embodiment.

FIGS. 9A and 9B are diagrams illustrating an example of operation definition information of the maintenance operation support device according to the embodiment.

FIGS. 10A and 10B are diagrams illustrating an example of operation definition information of the maintenance operation support device according to the embodiment.

FIGS. 11A to 11C are diagrams illustrating an example of operation definition information of the maintenance operation support device according to the embodiment.

FIG. 16 is a diagram illustrating another example of an operation procedure edited by the maintenance operation support device according to the embodiment.

DETAILED DESCRIPTION OF THE EMBODIMENTS

The embodiments of the present invention will be now described herein with reference to illustrative preferred embodiments. Those skilled in the art will recognize that many alternative preferred embodiments can be accomplished using the teaching of the present invention and that the present invention is not limited to the preferred embodiments illustrated herein for explanatory purposes.

An aspect of the present invention is to provide a maintenance operation support device, a maintenance operation support method, and a non-transitory computer readable storage medium capable of reducing a mistake in an operation procedure of a maintenance operator by notifying an operation procedure corresponding to various maintenance operations for facilities to thereby support improvement in the efficiency of maintenance operations.

Hereinafter, a maintenance operation support device, a maintenance operation support method, and a non-transitory computer readable storage medium according to an embodiment of the present invention will be described in detail with reference to the drawings.

Figure 1:
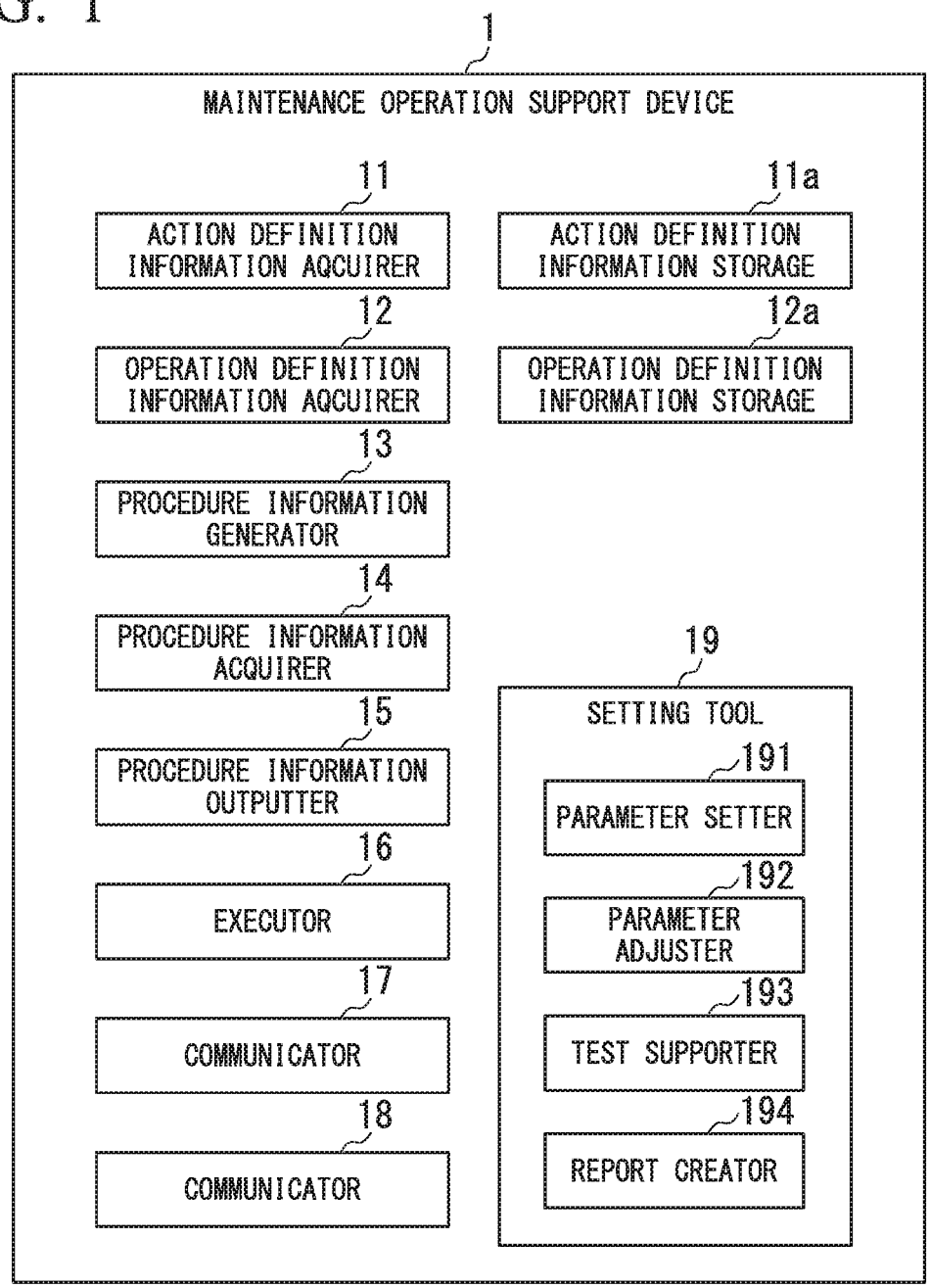
FIG. 1 is a block diagram illustrating an example of a software configuration of a maintenance operation support device according to an embodiment.

First, a software configuration of a maintenance operation support device will be described using FIG. 1. FIG. 1 is a block diagram illustrating an example of a software configuration of a maintenance operation support device 1 according to an embodiment.

In FIG. 1, the maintenance operation support device 1 has respective functions of an action definition information acquirer 11, an action definition information storage 11a, an operation definition information acquirer 12, an operation definition formation storage 12a, a procedure information generator 13, a procedure information acquirer 14, a procedure information outputter 15, an executor 16, a communicator 17, a communicator 18, and a setting tool 19. Moreover, the setting tool 19 has respective functions of a parameter setter 191, a parameter adjuster 192, a test supporter 193, and a report creator 194. The respective functions of the maintenance operation support device 1 are functional modules realized by a maintenance operation support program for controlling the maintenance operation support device 1. The maintenance operation support program is provided from a server that provides a program or is provided from a recording medium, for example.

The action definition information acquirer 11 acquires action definition information for defining an operation of the setting tool 19 that adjusts or sets facilities. The action definition information acquirer 11 acquires the action definition information from the action definition information storage 11a. The action definition information acquirer 11 may acquire the action definition information from outside of the maintenance operation support device 1 such as a cloud server connected to a separate network, for example. The facilities are field devices disposed in a plant, for example. The field device is a device that generates an electrical signal indicating a physical quantity (pressure, temperature, and the like) of a differential pressure gauge, a thermometer, or a flow meter, for example, or a device that outputs a control signal for changing an opening or the like of a control valve. The action definition information is a command, a function, an argument, and the like, for example, for operating the setting tool 19 and is information for adjusting or setting field devices using the setting tool 19. Examples of the action definition information include a command for causing a field device to execute zero-point adjustment, a command for causing a pressure generator to generate pressure, or a command to read a current signal such as 4 to 20 mA output from a field device. The action definition information is different depending on a type or a model of a field device. The details of the action definition information will be described with reference to FIGS. 5A to 5C and the like. The action definition information acquirer 11 acquires the action definition information at the time of activation of the maintenance operation support device 1, for example, from the action definition information storage 11a. The action definition information acquirer 11 provides the acquired action definition information to the procedure information generator 13.

In FIG. 1, a case in which the action definition information is acquired directly by the action definition information acquirer 11 is described. However, for example, the action definition information may be acquired indirectly by the action definition information acquirer 11 calling an arbitrary action definition information acquisition application. For example, the action definition information acquirer 11 may transmit action definition information acquisition command to an action definition information acquisition application outside the maintenance operation support device 1 to acquire action definition information corresponding to the command.

The action definition information storage 11a stores action definition information so as to be readable from the action definition information acquirer 11. The action definition information storage 11a can be realized using a storage device such as a hard disk drive (HDD) included in the maintenance operation support device 1. However, the action definition information acquirer 11 may acquire action definition information stored in a server connected by a network, for example, outside the maintenance operation support device 1. When the action definition information is stored separately from the action definition information acquirer 11, it is easy to perform management such as update of the action definition information.

The operation definition form acquirer 12 acquires operation definition information for defining operations to be instructed to a maintenance operator who performs maintenance operations for field devices. The operation definition information acquirer 12 acquires the operation definition information from the operation definition information storage 12a. However, the operation definition information acquirer 12 may acquire the operation definition information from outside of the maintenance operation support device 1 such as a cloud server connected to a separate network, for example. The maintenance operator who performs maintenance operations for field devices is an operator who sets field devices at sites in a plant at which a field device is installed. In the present embodiment, the maintenance operator refers to a person who performs operations on the basis of procedure information representing an operation procedure generated by the maintenance operation support device 1. Examples of the operations instructed to the maintenance operator include an operation on a field device, establishment of contact by transmission and reception of an email, and checking operations before starting an operation.

Examples of the operations instructed to the maintenance operator include an operation of opening and closing a three-way valve, an operation of controlling a flow rate, or an operation of generating a predetermined pressure manually in zero-point adjustment of field devices. The details of the operations instructed to the maintenance operator will be described with reference to FIGS. 4A and 4B and the like. The details of an operation to be instructed to the maintenance operator may be changed according to the skill of the maintenance operator. The operation definition information acquirer 12 acquires operation definition information at the time of starting the maintenance operation support device 1, for example, from the operation definition information storage 12a. The operation definition information acquirer 12 provides the acquired operation definition information to the procedure information generator 13.

The operation definition information storage 12a stores the operation definition information so as to be readable from the operation definition information acquirer 12. The operation definition information storage 12a can be realized using a storage device such as HDD included in the maintenance operation support device 1. However, the operation definition information acquirer 12 may acquire operation definition information stored in a server or the like connected by a network, for example, outside the maintenance operation support device 1. When the operation definition information is stored separately from the operation definition information acquirer 12, it is easy to perform management such as update of the operation definition information similarly to the action definition information. When the action definition information and the operation definition information are stored in a server or the like connected to a network, it is possible to allow these pieces of information to be acquired from a plurality of maintenance operation support devices 1.

The procedure information generator 13 combines the action definition information acquired by the action definition information acquirer 11 and the operation definition information acquired by the operation definition information acquirer 12 to generate procedure information representing an operation procedure of maintenance operations for field devices. The operation procedure of the procedure information generated by a combination of the action definition information and the operation definition information is determined by an execution order of operation items defined by the information of the action definition information and the operation definition information. The execution order of operation items can be edited by connecting an icon indicating an operation item displayed on an operation procedure editing screen to be described later using FIG. 3 to a predetermined connector. That is, the procedure information generator 13 can provide the operation procedure editing screen and generate procedure information representing the operation procedure according to the connection of the operation items edited on the operation procedure editing screen.

The procedure information acquirer 14 acquires procedure information representing an operation procedure of maintenance operations for field devices, generated by combining the action definition information and the operation definition information. The procedure information may be generated by the procedure information generator 13 and may be generated by a device other than the maintenance operation support device 1. The procedure information acquirer 14 may acquire the procedure information generated by a device other than the maintenance operation support device 1 instead of the procedure information generator 13. Upon acquiring the procedure information, the procedure information acquirer 14 provides the acquired procedure information to the procedure information outputter 15. For example, upon acquiring the procedure information, the procedure information acquirer 14 may notify the procedure information outputter 15 of acquisition of the procedure information and provide the procedure information according to a request from the procedure information outputter 15.

The procedure information outputter 15 outputs the procedure information generated by the procedure information generator 13 or acquired by the procedure information acquirer 14. The procedure information outputter 15 outputs the procedure information to a user interface (UI) that informs the maintenance operator of the procedure information, for example. The UI is a display device for allowing visual recognition of the procedure information, an audio output device for allowing recognition of the procedure information via sound, or a printing device that prints the procedure information, for example. When the UI is a display device, the procedure information outputter 15 outputs information representing the operation procedure to a display device as display data to be displayed on the display device exemplified as the procedure information (or converts the information to display data and outputs the same to the display device). The displayed operation procedure prompts the maintenance operator to perform a predetermined screen operation and the displayed content is changed by the screen operation of the maintenance operator, for example. The operation procedure displayed by the procedure information indicates the order of operations and an operation method using a flowchart or a list indicating the operation items to be performed, for example. Similarly, when the UI is an audio output device such as a speaker, the procedure information outputter 15 outputs the operation procedure as audio data (or converts the operation procedure to audio data and outputs the same). Moreover, when the UI is a printing device, the procedure information outputter 15 outputs the operation procedure as print data (or converts the operation procedure as print data and outputs the same). In the following description, a case in which the procedure information is display data will be described mainly. The details of the operation procedure displayed will be described later with reference to FIG. 3 and the like. Moreover, when the setting tool is outside the maintenance operation support device 1, the procedure information outputter 15 may output the procedure information to an external setting tool.

The procedure information output by the procedure information outputter 15 includes a flowchart representing at least a part of the operation procedure. Moreover, the procedure information output by the procedure information outputter 15 includes a list representing at least a part of the operation procedure. When the procedure information output by the procedure information outputter 15 is display data, it may be difficult to display all pieces of display data at once due to restriction of a display screen of the display device. For example, the size (length) of a flowchart or a list to be displayed is different depending on the number of operation items included in the flowchart or the list to be displayed or the display content. The procedure information outputter 15 may output display data for displaying at least a portion of the flowchart or the list so that the display content can be changed by scrolling or transitioning the screen.

The procedure information output unit 15 may output the procedure information by switching the flowchart or the list. When the procedure information is display data and the flowchart or the list is switched, the display of the flowchart or the list is switched. Examples of the display switching include switching from the display of a flowchart to the display of a list, switching from the display of a list to the display of a flowchart, switching from the display of a flowchart and a list to the display of any one of them, switching from the display of a flowchart and a list to a highlighted display of either one of them, and switching of the display layers of a flowchart and a list. The display switching may involve switching of a display mode such as highlighting, graying-out, and removal of a portion (for example, an operation item in execution and operation items having been executed) of the display content. Moreover, the display switching may involve switching to a display mode of displaying new information such as popup display.

The display may be switched according to a relevance of an operation item. For example, when a maintenance operation of zero-point adjustment is performed, relevant operation items include an operation in a pre-processing step that is performed before zero-point adjustment is performed, an operation in an execution step of executing zero-point adjustment, and an operation in a post-processing step that is performed after zero-point adjustment is executed as an operation item. Since a plurality of operation items included in the operations of these respective steps have high relevance, it may be easy to perform operations when these operation items are displayed at once. The procedure information outputter 15 may display an operation in the pre-processing step, an operation in the execution step, and an operation in the post-processing step collectively and switch the display screen for respective operations of the respective steps.

The display is switched when the procedure information outputter detects that the maintenance operator has performed a display switching operation, for example. The display switching operation may be pressing of an "OK" button to be described later in FIGS. 4A and 4B and the like, for example. When the procedure information is print data, the print content is switched according to switching of the display.

The procedure information outputter 15 may output the procedure information together with a progress state of the operation procedure. The progress state of the operation procedure is information displaying how much of the operation procedure has been performed when the procedure information is display data. The progress state of the operation procedure can be represented by displaying an operation item in execution as a pop-up, graying-out executed operation items, and highlighting an operation item to be executed next. That is, the display of the progress state of the operation procedure is one type of switching of a flowchart or a list.

The procedure information outputter 15 outputs the procedure information while changing the degree of detail of the operation procedure. The degree of detail of the operation procedure is the detailedness of the content of operation items included in the operation procedure. For example, one operation item may be expressed in more detail as a combination of a plurality of operation items. On the other hand, a plurality of operation items may be expressed collectively as one operation item. The degree of detail of the operation procedure can be changed according to the size of a display screen of a display device, a maintenance operator who is confirming the operation procedure, or the relevance of the operation item, for example.

Changing of the degree of detail according to the maintenance operator means changing the degree of detail according to the degree of skill of the maintenance operator for example. Some maintenance operators may have a junior-level skill such that the operator cannot perform a maintenance operation unless an operation procedure such as a method of operating individual devices and checking meters is described in detail. On the other hand, some maintenance operators may have a veteran-level skill such that the operator can operate devices and check meters on the basis of broad operation items to be performed. When the level (for example, a junior level, a middle level, a veteran level, a master level, and the like) the maintenance operator is designated, the procedure information outputter 15 outputs the procedure information with the degree of detail for operation items corresponding to the respective levels. In this way, detailed operation items are presented to a junior-level maintenance operator to prevent errors or omission of operations, and simplified operation items are presented to a veteran-level maintenance operator to provide an operation procedure which can be seen easily.

Changing of the degree of detail according to the maintenance operator may involve changing the degree of detail according to a request from a maintenance operator. For example, a veteran-level maintenance operator may want to check a detailed operation item for confirmation. Moreover, a junior-level maintenance operator may not need to check a detailed operation item when the operator performs the same operation repeatedly. The procedure information outputter 15 may change the degree of detail of the operation items according to an explicit instruction or setting by the maintenance operator.

The procedure information output 15 outputs the procedure information to the executor 16 as execution data executed by the executor 16 (or converts the procedure information to execution data and outputs the same). The executor 16 executes the operation items included in the procedure information generated by the procedure information generator 13 according to the operation procedure. As described above, the operation item includes execution of an operation of the setting tool for adjusting or setting facilities, defined by the action definition information and execution of an operation to be instructed to the maintenance operator, defined by the operation definition information.

The executor 16 executes an operation of the setting tool for adjusting or setting facilities, defined by the action definition information. The operation of the setting tool may be one operation of the setting tool (for example, an operation of outputting a predetermined voltage once for a predetermined period) and may be a plurality of operations of the setting tool (for example, an operation of sequentially outputting different voltages at predetermined intervals). Moreover, the executor 16 may execute operations in a plurality of operation items of the setting tool sequentially on the basis of the order of the operation procedure.

The executor 16 manages execution of maintenance operations defined by the operation definition information according to the operation procedure of the operation items. For example, the executor 16 informs the maintenance operator of the details of operations to be executed in the operation items to prompt execution of the maintenance operation and confirms the input of the end of an operation by the maintenance operator to thereby manage execution of maintenance operations.

The executor 16 can prompt execution of the maintenance operation by prompting the maintenance operator to input the results of the maintenance operation, for example. The executor 16 confirms execution of one operation item and then prompts execution of a maintenance operation of the next operation item. The procedure information may include start information representing the start of an operation item and end information representing the end of an operation item, and the executor 16 may execute operation items ranging from the start information to the end information. The executor 16 may record execution results of the operation items included in the procedure information.

Figure 2:
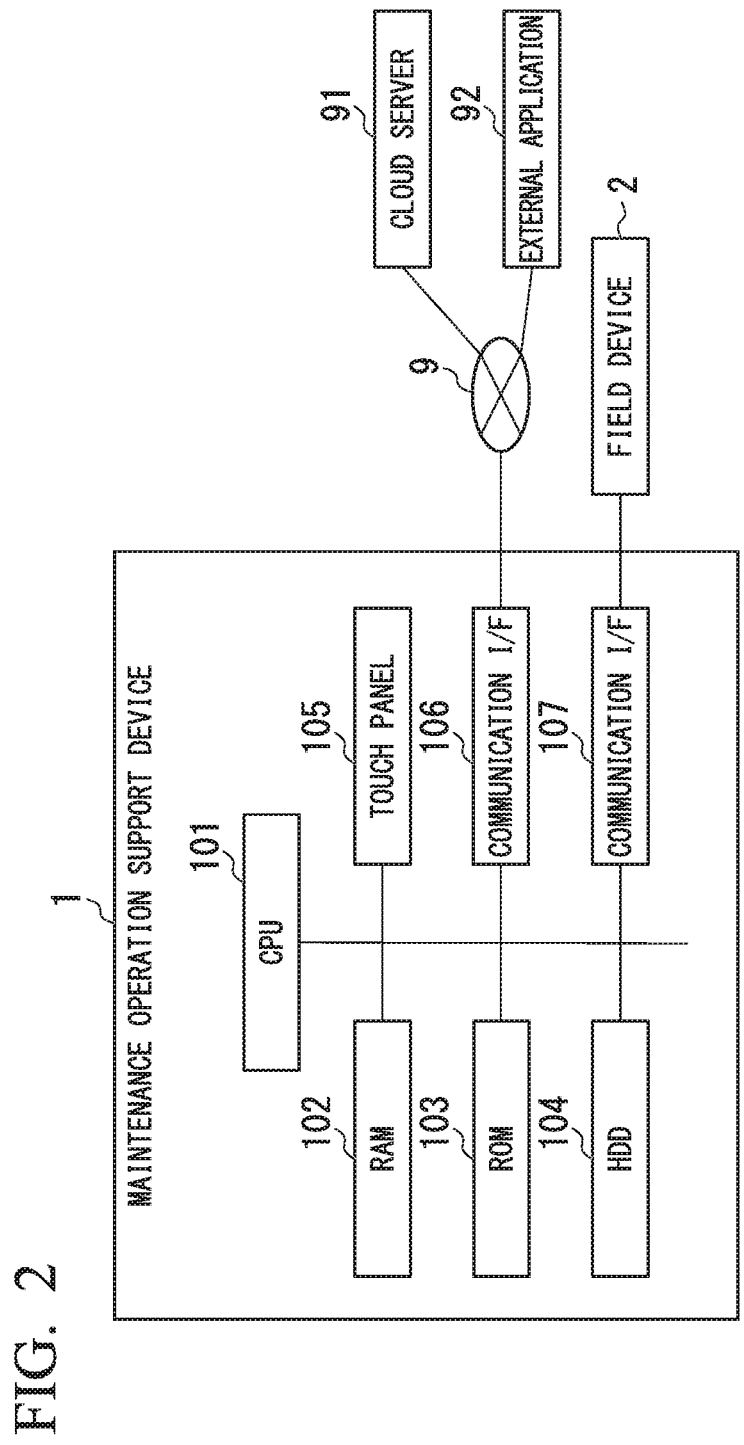
FIG. 2 is a block diagram illustrating an example of a hardware configuration of the maintenance operation support device according to the embodiment.

The communicators 17 and 18 control communication via a communication I/F (interface) 106 and a communication I/F 107 to be described in FIG. 2, respectively. The communicator 17 performs communication control corresponding to a general-purpose communication standard such as wireless LAN communication, cable LAN communication, infrared communication, short-range wireless communication, and universal serial bus (USB) for example. The communicator 17 may control protocols for transmitting and receiving mails.

The communicator 18 controls communication with devices such as field devices via cable communication or wireless communication. The communication I/F 107 performs communication control corresponding to a field communication standard such as ISA100, HART (registered trademark), BRAIN (registered trademark), FOUNDATION Fieldbus, and PROFIBUS, for example.

The setting tool 19 is a tool for adjusting or setting field devices at an installation site in a plant or a monitoring room remote from the plant. The setting tool 19 is a program operating on a general-purpose device such as a note-type PC, a tablet-type PC, a PDA, or a smartphone or a device dedicated for maintenance operations, for example. FIG. 1 illustrates a case in which the setting tool 19 operates on the maintenance operation support device 1. However, the setting tool 19 may operate on a device separate from the maintenance operation support device 1 such as a note-type PC capable of communicating with the maintenance operation support device 1 via cables or wirelessly. The setting tool 19 may have the respective functions of the parameter setter 191, the parameter adjuster 192, the test supporter 193, and the report creator 194, and at least one of these functions may operate on a device separate from the maintenance operation support device 1. In the present embodiment, even when some of the functions of the setting tool 19 operate on a device separate from the maintenance operation support device 1, it is assumed that a system including the functions of the setting tool 19 is an embodiment of the maintenance operation support device 1.

The parameter setter 191 sets parameters of field devices. Examples of the parameters of field devices include information for identifying a field device such as a device tag, a device address, a manufacturer, a device ID or a device type, a model name, and a communication standard of the field device, a setting value for determining the operation of the field device, information representing the state of the field device, or a measurement value measured in the field device. That is, the parameters may include a fixed value such as a device ID and a variable value such as a setting value or a measurement value of the field device. The parameter setter 191 may analyze a device description (DD) that electronically describes parameters of a specific field device, for example, and may set the processes of the field device. The parameter setter 191 may perform a tag/address/role setting operation, a setting limitation setting/canceling operation, a device type manage (DTM) installing operation, a device description (DD) installing operation, a parameter acquisition operation, a valve calibration operation, a device squawking operation, an ISA100 provisioning operation, a device online service/offline service switching operation, a service mode switching operation, and a valve partial stroke test (a partial operation test).

The parameter adjuster 192 adjusts the parameters of field devices. The parameters include an adjustment parameter for adjusting the output or the like of field devices. The parameter adjuster 192 adjusts an increase or decrease in the setting value of a parameter. The parameter adjuster 192 and the parameter setter 191 may be collectively referred to as a setting and adjusting unit.

The test supporter 193 supports a maintenance operation such as a zero-point adjustment or an input loop test for a field device, for example. In the input loop test, the test supporter 193 outputs a pseudo signal corresponding to a predetermined test pattern with respect to respective test target loops, for example.

The report creator 194 creates and outputs a report. For example, the report creator 194 creates and outputs the report based on at least one of the result of a maintenance operation executed in the setting tool 19, progress midway through maintenance operations, progress midway during interruption of maintenance operations, and information related to maintenance operations (for example, at least one of a specification, a type, a serial number of a device used in the maintenance operation, and stock information of consumables used in the maintenance operation). The report creator 194 may output the report in a format selected from a plurality of formats. The report creator 194 may store the result of the maintenance operation as history data.

In FIG. 1, a case in which the respective functions of the action definition information acquirer 11, the operation definition information acquirer 12, the procedure information generator 13, the procedure information acquirer 14, the procedure information outputter 15, the executor 16, the communicator 17, the communicator 18, and the setting tool 19 of the maintenance operation support device 1 are realized by software has been described.

However, one of more of the functions of the maintenance operation support device 1 may be realized by hardware. Each of the respective functions of the maintenance operation support device 1 may be divided into a plurality of functions and executed. Moreover, two or more of the respective functions of the maintenance operation support device 10 may be integrated into one function and executed.

Next, a hardware configuration of the maintenance operation support device 1 will be described with reference to FIG. 2. FIG. 2 is a block diagram illustrating an example of a hardware configuration of the maintenance operation support device according to the embodiment.

In FIG. 2, the maintenance operation support device 1 includes a central processing unit (CPU) 101, a random access memory (RAM) 102, a read only memory (ROM) 103, a HDD 104 a touch panel 105, a communication interface (I/F) 106, and a communication 107.

The maintenance operation support device 1 is a general-purpose device such as a note-type PC, a tablet-type PC, a PDA, or a smartphone or a device dedicated for maintenance operation support. The maintenance operation support device 1 executes the maintenance operation support program described with reference to FIG. 1.

The CPU 101 controls the maintenance operation support device 1 by executing the maintenance operation support program stored in the RAM 102, the ROM 103, or the HDD 104. The maintenance operation support program is acquired from a recording medium that records the maintenance operation support program or a server or the like that provides the maintenance operation support program via a network, for example. The maintenance operation support program is installed in the HDD 104 and is stored in the RAM 102 so that the program can be read from the CPU 101.

The touch panel 105 has an operation displaying function including an operation input function and a displaying function. The touch panel 105 displays an operation procedure on the basis of the display data output by the procedure information outputter 15. Moreover, the touch panel 105 displays information such as maintenance information related to maintenance of the field device 2, displayed by the setting tool 19. The touch panel 105 allows an operator to input operations using a fingertip or a touch pen. In the present embodiment, a case in which the maintenance operation support device 1 uses the touch panel 105 having an operation displaying function is described. However, the maintenance operation support device 1 may include a display device having a displaying function and an operation input device having an operation input function. In this case, a display screen of the touch panel 105 can be used as a display screen of a display device, and an operation on the touch panel 105 can be performed as an operation on an operation input device.

The touch panel 105 may be realized as various forms such as a head-mounted display, an eye glasses-type display, or a wrist watch-type display.

The communication I/F 106 controls communication with other devices that use a general-purpose communication standard such as wireless LAN communication, cable LAN communication, infrared communication, and short-range wireless communication via the network 9. Examples of the other devices include a cloud server 91 and a device in which an external application 92 is installed. The cloud server 91 is a server that provides a cloud service by cloud computing. The cloud server 91 can store information such as the action definition information and the operation definition information. The cloud server 91 can provide the same information as that provided to the maintenance operation support device 1 to other maintenance operation support devices (not illustrated). The external application 92 is an application operating outside the maintenance operation support device 1 and may be a portion of the functions of the maintenance operation support device described with reference to FIG. 1, for example. Moreover, the communication I/F 106 may be another maintenance operation support device (not illustrated), the field device 2 that can perform general-purpose communication, a maintenance information management server that manages maintenance information, a distributed control system (DCS) controller, a programmable logic controller (PLC), or the like. FIG. 2 illustrates a case in which the external application 92 is installed in a device connected via a network. However, an application having the same function may be present in the maintenance operation support device 1 or a recording medium that is readable from the maintenance operation support device 1.

The communication I/F 107 controls field communication with the field device 2 using a communication protocol that can be used in the field device 2. Various field communication protocols may be used in various field devices 2 used in the plant. The communication I/F 107 controls communication with the field device 2 that uses a field communication standard such as ISA100, HART (registered trademark), BRAIN (registered trademark), FOUNDATION Fieldbus, and PROFIBUS, for example. The maintenance operation support device 1 may have a plurality of communication I/Fs 107 corresponding to the types of field communication.

Figure 3:
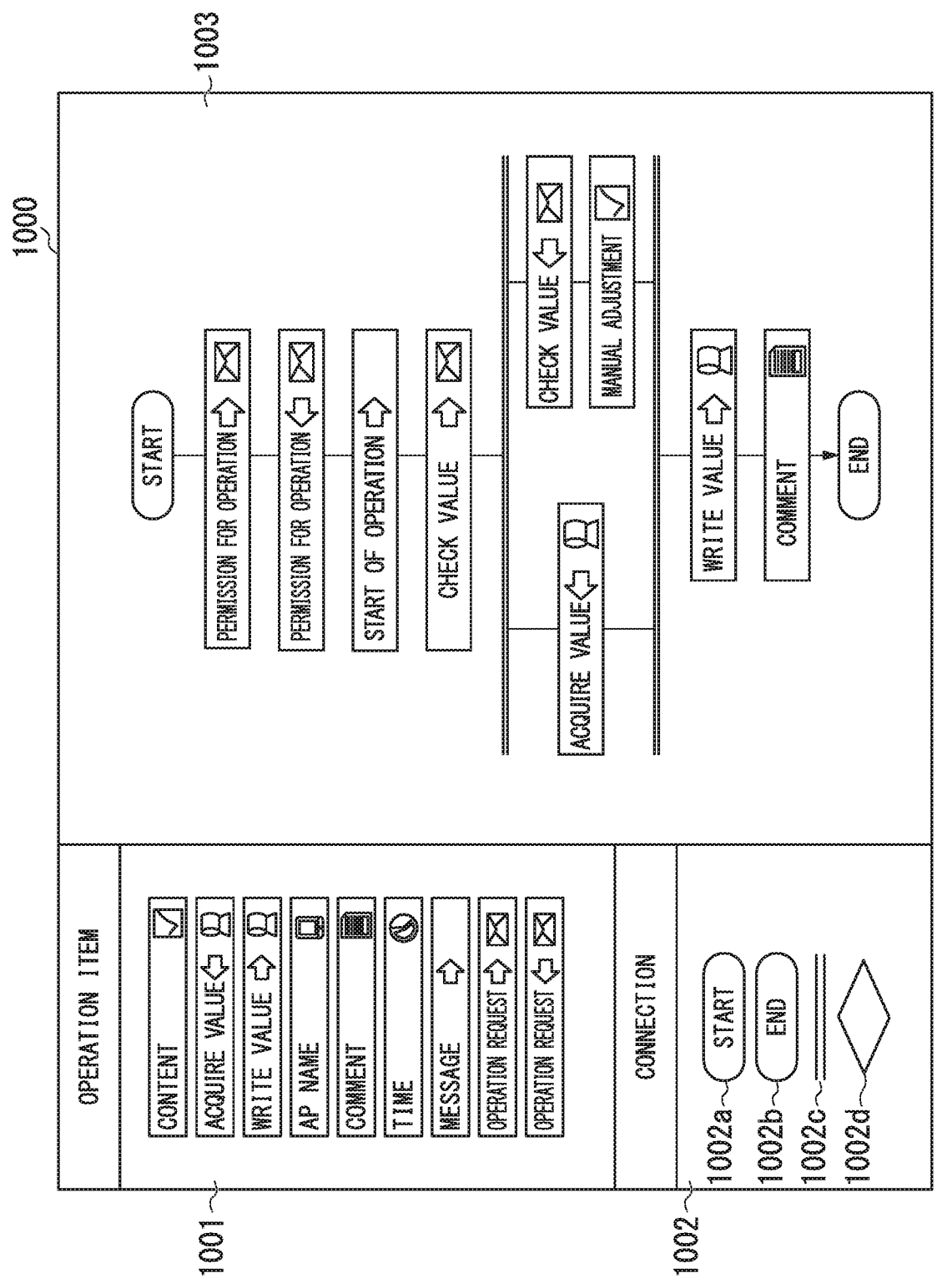
FIG. 3 is a diagram illustrating an example of an operation procedure screen of the maintenance operation support device according to the embodiment.

Next, an operation procedure editing screen displayed on the basis of the display data output by the procedure information outputter 15 will be described with reference to FIG. 3. FIG. 3 is a diagram illustrating an example of an operation procedure editing screen of the maintenance operation support device 1 according to the embodiment.

An operation procedure editing screen 1000 illustrates a display screen (display data) displayed on the touch panel 105. The operation procedure editing screen 1000 is a UI which enables the user of the maintenance operation support device 1 to edit the operation procedure. The operation procedure editing screen 1000 has an operation item selection area 1001, a connection area 1002, and an operation procedure editing area 1003.

The operation item selection area 1001 displays operation items related to the action definition information and operation items related to the operation definition information in a selectable manner. The action definition information is information that defines the operation of the setting tool 19 for adjusting or setting field devices. The operation definition information is information that defines operations to be instructed to the maintenance operator who performs maintenance operations for field devices. The operation item selection area 1001 has touch (button) regions that display respective pieces of action definition information and respective pieces of operation definition information as character strings and icons. A user can select an operation item by touching a touch region on the touch panel using a fingertip or the like.

The connection area 1002 displays a connector to be connected to the operation item selected in the operation item selection area 1001 in a selectable manner. Examples of the connector include a "terminal" of a flowchart such as "start" 1002a or "end" 1002b, "parallelism (synchronization)" 1002c represented by dual parallel lines, and a "determination" 1002d represented by a rhombus. The connection area 1002 may display elements such as a flow line or an arrow indicating the flow of processes of a flowchart as connectors in a selectable manner, for example. A user can select a connector by touching a touch region of the connector displayed in the connection area 1002 using a fingertip or the like.

The operation procedure editing area 1003 displays the operation items selected in the operation item selection area 1001 so that at least any one of the selected operation items can be arranged therein. The operation procedure editing area 1003 arranges the selected operation items and the selected connectors by connecting them by flow lines. The operation items or the connectors may be arranged by selecting operation items displayed in the operation item selection area 1001 using a mouse and dragging and dropping the selected operation items in the operation procedure editing area 1003, for example. The operation items may be connected by selecting and connecting two operation items displayed in the operation procedure editing area 1003 in an execution order for example.

A flowchart indicating the operation procedure created or edited in the operation procedure editing area 1003 may be stored when a save button (not illustrated), for example, is pressed.

Next, the details of the action definition information and the operation definition information will be described with reference to FIGS. 4A and 4B to FIGS. 11A to 11C. FIGS. 4A and 4B to FIGS. 11A to 11C illustrate elements of an operation item selected in the operation item selection area 1001.

FIGS. 4A and 4B are diagrams illustrating a "completion" element of the operation definition information of the maintenance operation support device according to the embodiment. The "completion" element is an example of the operation definition information displayed in the operation item selection area 1001.

FIG. 4A illustrates a display image of the "completion" element displayed in the operation item selection area 1001 in a selectable manner. The "completion" element has a "content" character string indicating the details of a completed operation and a checkbox icon.

FIG. 4B illustrates an editing mage of the "completion" element when the "completion" element arranged in the operation procedure editing area 1003 is selected. The editing image of the "completion" element has a text box for the "content" and an "OK" button indicating completion of editing. A user inputs a character string indicating an operation item in a text box. A checkbox designates whether a checkbox will be displayed during execution of an operation procedure. When editing is completed, a user presses the "OK" button to save the edited content of the "completion" element.

FIG. 4B also illustrates a display image of the "completion" element when the flowchart of the operation procedure is executed by the executor 16. When the operation item illustrated in the text box of the "completion" elements completed, a maintenance operator fills in a check mark in the checkbox and presses the "OK" button. In this way, the flowchart of the operation procedure can proceed to the next step.

In the following description including FIGS. 4A and 4B, a case in which the "OK" button is pressed to cause the flowchart of the operation procedure to proceed to the next step manually as described above is illustrated. However, a method of causing the flowchart to proceed to the next step is not limited to this. For example, when the maintenance operation support device 1 acquires predetermined information, the flowchart of the operation procedure may proceed to the next step automatically. An example of the predetermined information is reception of a reply to email transmission, acquisition of execution results of zero-point adjustment or the like, a detection signal indicating the fact that the value of a meter has reached a predetermined value, a signal indicating completion of execution of an operation item, or the elapse (timeout) of a predetermined standby period.

The character string in the text box may be added to, changed, or edited by a maintenance operator. By allowing the maintenance operator to edit the character string, it is possible to write a memo on the record during execution of a maintenance item. A button for appending a captured image and a button for recording parameters acquired from field devices, for example, may be added to the "completion" element.

FIGS. 5A to 5C are diagrams illustrating a "data acquisition" element of the action definition information of the maintenance operation support device according to the embodiment. The "data acquisition" element is an example of the action definition information displayed in the operation item selection area 1001.

FIG. 5A illustrates a display image of a "data acquisition" element displayed in the operation item selection area 1001 in a selectable manner. The "data acquisition" element has a character string of "value acquisition" indicating acquisition of data (parameters) of a field device and an icon of the field device.

FIG. 5B illustrates an editing image of the "data acquisition" element when the "data acquisition" element arranged in the operation procedure editing area 1003 is selected. The editing image of the "data acquisition" element has a text box of "To" indicating a data acquisition target field device, a text box of "parameter" indicating parameters to be acquired from the field device, and an "OK" button indicating completion of editing. FIG. 5B illustrates a setting for acquiring a "PV" value of a pressure transmitter having a model name of "FI1001(EJX)" as a field device. An operation item that can be executed automatically without any manual operation of the maintenance operator, such as data acquisition from a field device, may be defined as an operation item designated by the action definition information.

As for an operation item that can be executed automatically, a checkbox indicating completion of a maintenance item by a maintenance operator such as illustrated in FIG. 4B is not necessary. When editing is completed, the user presses an "OK" button to save the edited content of the "data acquisition" element.

FIG. 5C also illustrates a display image of the "data acquisition result" element when the flowchart of an operation procedure is executed by the executor 16. The "data acquisition result" element shows that "PV" value is acquired as "parameter" of a field device having model name of "FI-1001(EJX)" "data" indicating the PV value is "20.4 KPA", and "status" indicating success or failure in data acquisition is "success".

The maintenance operator presses the "OK" button when a parameter acquisition operation item designated from the field device, illustrated in the text box of the "data acquisition" element is completed. In this way, it is possible to cause the flowchart of the operation procedure to proceed to the next step.

In FIGS. 5B and 5C, the "data acquisition" element that acquires one parameter from one field device is illustrated. However, the "data acquisition" element may be created so that a plurality of parameters is acquired from one field device. For example, a parameter may be acquired from one field device a predetermined number of times at predetermined time intervals. Moreover, the "data acquisition" element may be created so that one or a plurality of parameters are acquired from each of a plurality of field devices. For example, parameters of each of two or more field devices having parameters which affect each other in a process of a plant may be acquired at predetermined timings.

FIGS. 6A to 6C are diagrams illustrating a "data writing" element of the action definition information of the maintenance operation support device according to the embodiment. The "data writing" element is an example of the action definition information displayed in the operation item selection area 1001.

FIG. 6A illustrates a display image of the "data writing" element displayed in the operation item selection area 1001 in a selectable manner. The "data writing" element has a character string of "write value" meaning writing of data (parameters) of the field device 2 and an icon of the field device.

FIG. 6B illustrates an editing image of the "data writing" element when the "data writing" element arranged in the operation procedure editing area 1003 is selected. The editing image of the "data writing" element has a text box of "To" indicating a data write target field device, a text box of "parameter" indicating a parameter to be written to the field device, a text box of "data" indicating the value of the parameter to be written, and an "OK" button indicating completion of editing. FIG. 6B illustrates a setting for writing "0.0 KPA" to "LRV (lower limit)" of a pressure transmitter having a model name of "FI-1001(EJX)" as a field device. When editing is completed, the user presses an "OK" button to save the edited content of the "data writing" element.

FIG. 6C also illustrates a display image of the "data writing result" element when the flowchart of the operation procedure is executed by the executor 16. The "data writing result" element shows that "0.0 KPA" is written as "data" of the lower for "LRV" which is the "parameter" of a field device having a model name of "FI-1001(EJX)" and "status" indicating success or failure in data writing is "success".

The maintenance operator presses the "OK" button when a parameter writing operation item designated for the field device, illustrated in the text box of the "data writing" element is completed. In this way, it is possible to cause the flowchart of the operation procedure to proceed to the next step.

In FIGS. 6B and 6C, the "data writing" element that writes one parameter for one field device is illustrated. However, the "data write" element may be created so that a plurality of parameters is written for one field device. For example, a parameter which changes in a stepwise manner at predetermined time intervals may be written for one field device. Moreover, the "data writing" element may be created so that one or a plurality of parameters are written for each of a plurality of field devices. For example, parameters of each of two or more field devices having parameters which affect each other in the process of a plant may be written at predetermined timings.

FIGS. 7A and 7B are diagrams illustrating an "AP activation" element of the action definition information of the maintenance operation support device according to the embodiment. The "AP activation" element is an example of the action definition information displayed in the operation item selection area 1001.

FIG. 7A illustrates a display image of the "AP activation" element displayed in the operation item selection area 1001 in a selectable manner. The "AP activation" element has text of "AP name" indicating activation of an application and an icon of an application program (hereinafter sometimes referred to as an "application").

FIG. 7B illustrates an editing image of the "AP activation" element when the "AP activation" element arranged in the operation procedure editing area 1003 is selected. The editing image of the "AP activation" element has a text box of "To" for designating a maintenance operation support device that uses an application, a text box of "AP name" for designating an application to be activated, a text box for designating an "argument" to be passed to the application designated by the "AP name", and an "OK" button indicating completion of editing. In FIG. 7B, "maintenance device 1" is designated in "To" as the maintenance operation support device that uses an application. Moreover, "FieldMate" is designated as an application to be activated. Moreover, an argument is not designated. "FieldMate" is an application for executing the functions of the setting tool 19. An argument is information that defines an operation of an application. By passing an argument to an application, it is possible to activate the application in a state designated by the argument, for example. For example, the functions of the setting tool 19 such as a parameter setting function, a parameter adjustment function, a test support function, and a report creating function may be designated as arguments so that the designated functions are executed. The application to be activated may be the external application 92 in FIG. 2. By using the "AP activation" element in the operation item, various functions of the application can be used in the maintenance operation. When editing is completed, the user presses the "OK" button to save the edited content of the "AP activation" element. The application to be activated may be an internal application (not illustrated in FIG. 1) included in the maintenance operation support device 1. That is, in the "AP activation" element, it is assumed that the location of an application to be activated can be designated arbitrarily.

When it is not necessary to inform the maintenance operator of the success or failure in activation in the "AP activation" element, the "AP activation" element may not be displayed when the flowchart of the operation procedure is executed by the executor 16. Moreover, a plurality of applications may be designated to be activated. The plurality of applications to be activated may be executed simultaneously and may be executed sequentially.

FIGS. 8A and 8B are diagrams illustrating a "questionnaire" element of the operation definition information of the maintenance operation support device according to the embodiment. The "questionnaire" element is an example of the operation definition information displayed in the operation item selection area 1001.

FIG. 8A illustrates a display image of the "questionnaire" element displayed in the operation item selection area 1001 in a selectable manner. The "questionnaire" element has text of "comments" indicating the input of comments and an icon of questionnaire.

FIG. 8B also illustrates a display image of the "questionnaire" element when the flowchart of the operation procedure is executed by the executor 16. The maintenance operator presses the "OK" button when input of contracts to the text box of the "questionnaire" element is completed. In this way, the flowchart of the operation procedure can proceed to the next step.

A button for appending a captured image or recorded audio and a button for recording parameters acquired from field devices, for example, may be added to the "questionnaire" element.

FIG. 9A illustrates a display image of a "standby" element displayed in the operation item selection area 1001 in a selectable manner. The "standby" element has text of "time" indicating a standby period and an icon of a watch.

FIG. 9B illustrates an editing image of the "standby" element when the "standby" element arranged in the operation procedure editing area 1003 is selected. The editing image of the "standby" element has a text box of "time" for designating a standby period and an "OK" button indicating completion of editing. The standby period is a period for preventing an operation item from proceeding to the next element and processing is not completed until the standby period has elapsed.

Although the standby period is designated as 60 seconds in FIG. 9B, the standby period may be designated as a period which varies according to certain conditions, for example. Moreover, a time point may be designated to the standby period. When editing is completed, the user presses the "OK" button to save the edited content of the "standby" element.

FIG. 10A illustrates a display image of a "notification" element displayed in the operation item selection area 1001 in a selectable manner. The "notification" element has text of "message" indicating notification of a message and an icon of an arrow.

FIG. 10B illustrates an editing image of the "notification" element when the "notification" element arranged in the operation procedure editing area 1003 is selected. The editing image of the "notification" element has a text box of "To" for designating a notification destination of a message, "title" indicating the title of the message, a text box for inputting a notification content, an attachment file icon indicating an attachment file, and an "OK" button indicating completion of editing. The message is notified (transmitted) from a maintenance operator in the field to a notification destination designated by "To". A default character string is input in the content of the message. When editing is completed, the user presses the "OK" button to save the edited content of the "notification" element.

FIG. 10B also illustrates a display image of the "notification" element when the flowchart of the operation procedure is executed by the executor 16. The maintenance operator presses the "OK" button when input of a message to the text box of the "notification" element is completed. In this way, the flowchart of the operation procedure can proceed to the next step. In the "notification" element, the notification destination (To), the title, and the content of the message may be able to be changed appropriately. The content of the message may be a fixed-form message and may be a free-form message. Moreover, it may be a required operation condition to attach a captured image or recorded audio as the attachment file. The user presses the "OK" button whereby the flowchart of the operation procedure can proceed to the next step.

FIG. 11A illustrates a display image of a "request" element displayed in the operation item selection area 1001 in a selectable manner. The "request" element has text of "operation request" indicating a request for an operation and an icon of an arrow. The "request" element in FIG. 11A illustrates a bidirectional operation request.

FIG. 11B illustrates an editing image of the "request" element when the "request" element arranged in the operation procedure editing area 1003 is selected. The editing image of the "request" element has a text box of "To" for designating a request destination of the operation request, a "title" indicating the title of the operation request, a text box for inputting the details of an operation requested, an attachment file icon indicating an attachment file, and an "OK" button indicating completion of editing. The message is transmitted from a maintenance operator in the field to a request destination designated by "To". The "request" element prompts the request destination to send a reply. When the editing is completed, the user presses the "OK" button to save the edited content of the "request" element.

FIG. 11B also illustrates a display image of the "request" element when the flowchart of the operation procedure is executed by the executor 16. The maintenance operator presses the "OK" button when the input of a message to the text box of the "request" element is completed. In this way, the request content is transmitted to the request destination. An image captured by the maintenance operator or the recorded audio can be attached to the attachment file.

FIG. 11B also illustrates a display image of the "request" element when the flowchart of the operation procedure is executed by the executor 16. The maintenance operator presses the "OK" button when the input of a message to the text box of the "request" element is completed whereby the request content is transmitted to the request destination. An image captured by the maintenance operator or a recorded audio can be attached to the attachment file. The maintenance operator presses the "OK" button whereby the flowchart of the operation procedure can proceed to the next step (waiting for a reply to a request).

FIG. 11C also illustrates display image of a reply to a "request" when the flowchart of the operation procedure is executed by the executor 16. A request destination (an operator) having received a request from the maintenance operator checks the content of the text box of the "request" element and then sends a reply to the request to the maintenance operator. FIG. 11C illustrates that the content of the reply is permission for an operation. The maintenance operator presses the "OK" button whereby the flowchart of the operation procedure can proceed to the next step. When the content of the reply is an operation not being permitted, the flowchart of the operation procedure cannot proceed to the next step.

Figure 12:
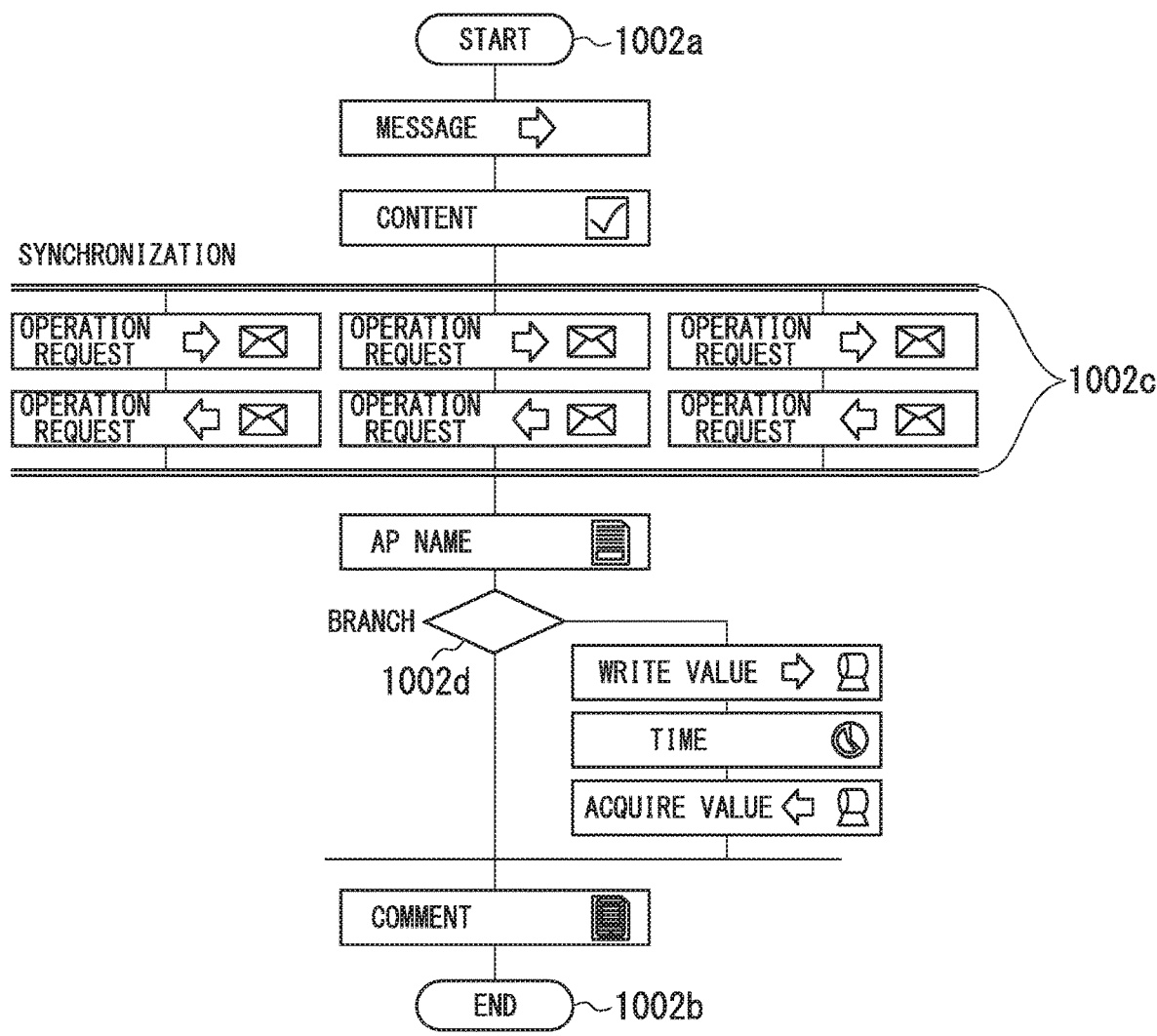
FIG. 12 is a diagram illustrating an example of an operation procedure edited by the maintenance operation support device according to the embodiment.

Next, the edited operation procedure will be described with reference to FIG. 12. FIG. 12 is a diagram illustrating an example of an operation procedure edited by the maintenance operation support device according to the embodiment.

In FIG. 12, the operation items defined by the action definition information and the operation definition information described above and a flowchart edited by the connectors (1002a to 1002d) are illustrated in the operation procedure editing area 1003. Here, the synchronization 1002c indicates that three "request" elements are executed in parallel in the operation procedure and the "AP activation" element is executed when all "request" elements are completed.

In FIG. 12, the branch 1002d indicates that the operation items to be executed are different depending on a branching condition. In the operation procedure editing area 1003, by allowing a maintenance operator to edit an operation procedure that has been saved once, it is possible to easily change the operation procedure and create similar operation procedures.

Figure 13:
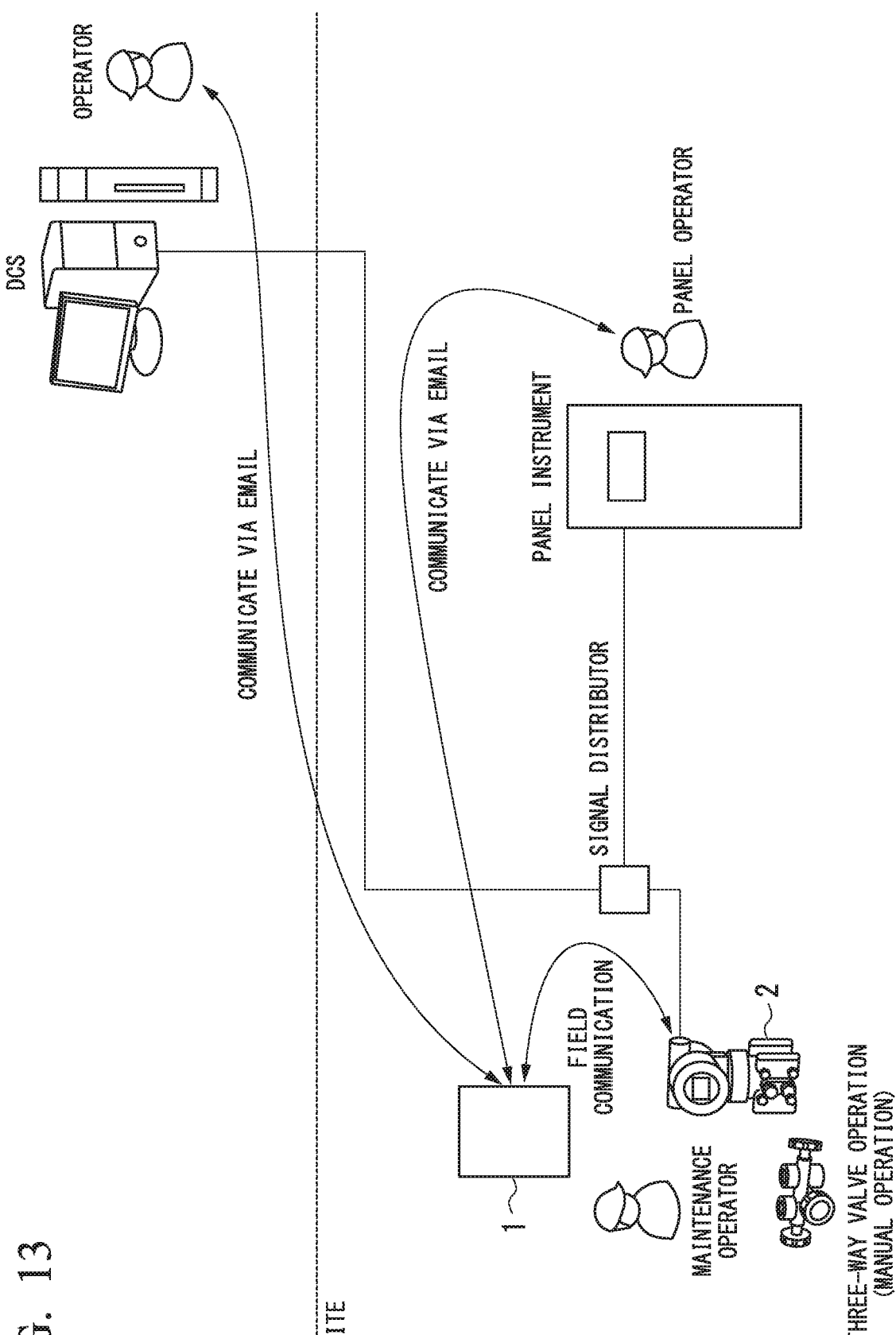
FIG. 13 is a diagram illustrating an example of a system configuration for performing zero-point adjustment using the maintenance operation support device according to the embodiment.

Next, a system configuration of performing zero-point adjustment will be described with reference to FIGS. 13 to 15. FIG. 13 is a diagram illustrating a system configuration of performing zero-point adjustment using the maintenance operation support device 1 according to the embodiment.

In FIG. 13, the field device (a differential pressure transmitter) 2 is connected to a panel instrument via a signal distributor and a DCS and is controlled. It is assumed that a panel operator is in front of the panel instrument and an operator is in front of the DCS. The zero-point adjustment performed when the panel operator who monitors the panel instrument and the operator who monitors the DCS monitor the output of the field device which changes according to an operation on the three-way valve by the maintenance operator. The maintenance operation support device 1 is connected to the field device 2 by field communication. Moreover, the maintenance operation support device 1 can establish contact with the operator via email. Furthermore, the maintenance operation support device 1 can also establish contact with the panel operator via email.

The maintenance operation support device 1 can operate the field device 2 and can establish contact with the operator or the panel operator according to the operation procedure. Therefore, it is possible to prevent omission of a maintenance operation and to improve the operation efficiency.

Figure 14:
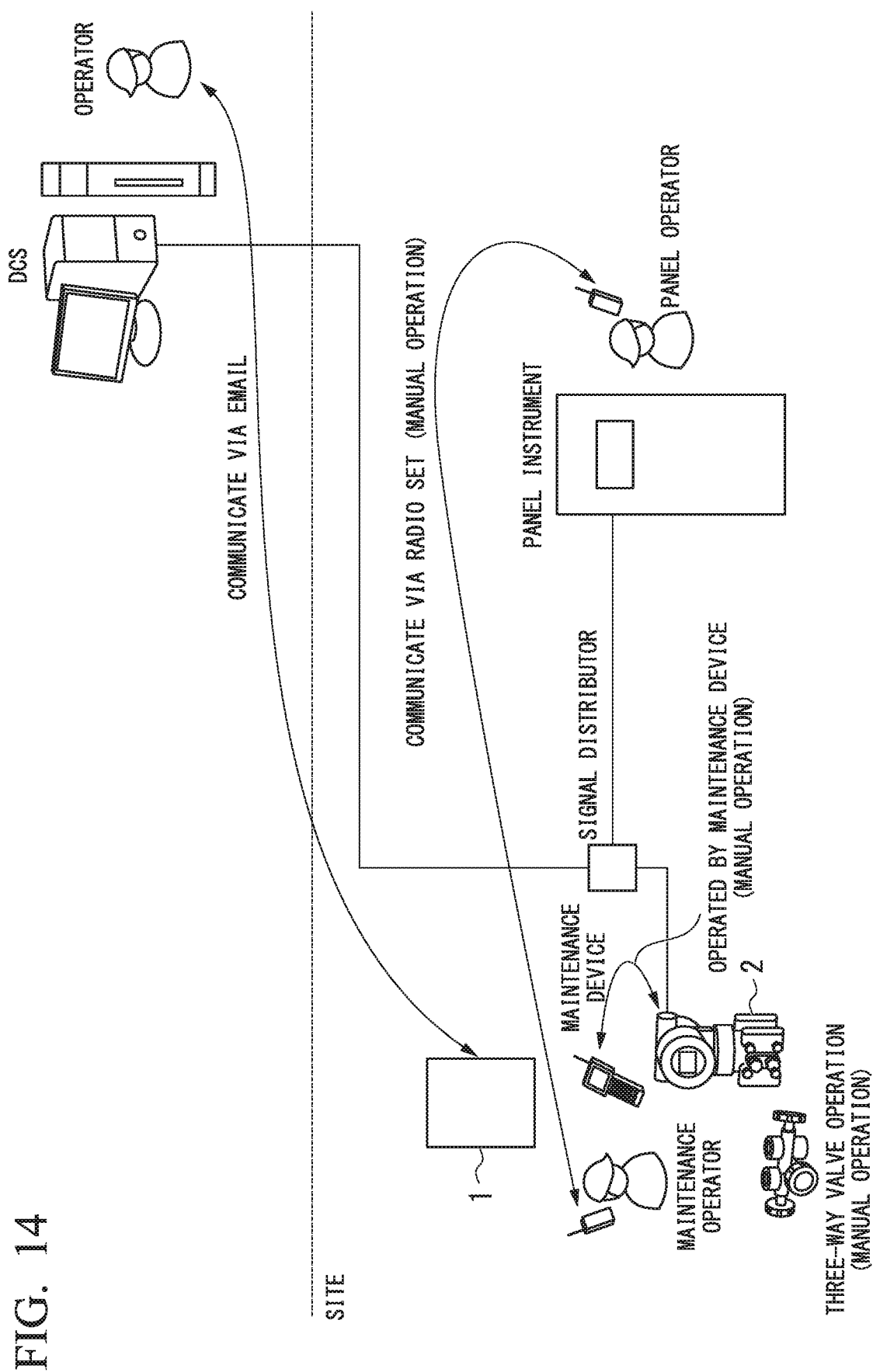
FIG. 14 is a diagram illustrating another example of a system configuration of performing zero-point adjustment using the maintenance operation support device according to the embodiment.

FIG. 14 is a diagram illustrating another example of a system configuration of performing zero-point adjustment using the maintenance operation support device 1 according to the embodiment.

FIG. 14 illustrates a case in which the maintenance operation support device 1 can establish contact with the operator only via email unlike FIG. 13. In FIG. 14, it is assumed that the maintenance operation for a field device is performed by a maintenance device and communication the panel operator is performed using a transceiver Since the maintenance operator uses the maintenance operation support device 1 even when executing the maintenance operation of the maintenance device, it is possible to establish contact with the operator in the same operation procedure as illustrated in FIG. 13 and to generate an operation procedure under the assumption that communication with the panel operator is performed using a transceiver. That is, the maintenance operation support device 1 can construct an operation procedure flexibly according to an execution environment of the maintenance operation and can support improvement in the efficiency of the maintenance operation.

Figure 15:
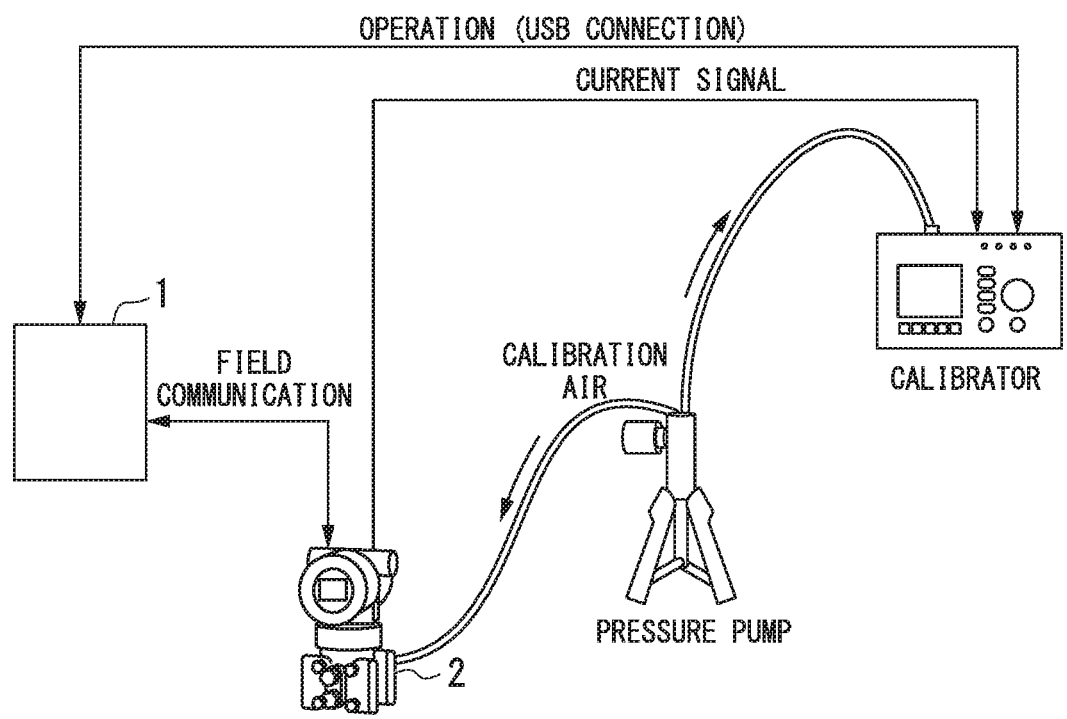
FIG. 15 is a diagram illustrating an example of a system configuration of performing calibration using the maintenance operation support device according to the embodiment.

FIG. 15 is a diagram illustrating an example of a system configuration of performing calibration of the field device 2 using the maintenance operation support device 1 according to the embodiment. Calibration of the field device 2 in the present embodiment refers to an operation of measuring an input value and an output value of the field device 2 and calculating an error (a relative error) or the like. Moreover, adjustment of the field device 2 in the present embodiment is an operation of adjusting an output value to decrease an error and is zero-point adjustment, for example.

In FIG. 15, the pressure pump supplies calibration air having the same pressure to the field device (the differential pressure transmitter) 2 and a calibrator. The field device (the differential pressure transmitter) 2 outputs a current signal to the calibrator according to the pressure of the calibration air supplied from the pressure pump. The calibrator can measure the pressure of the calibration air supplied from the pressure pump and the current value output from the field device 2 with high accuracy. Here, when calibration of the field device is performed without using the maintenance operation support device 1, the maintenance operator connects the field device 2, the calibrator, and the pressure pump as illustrated in the drawing and performs a calibration operation according to an operation procedure of the calibrator. Connection of the field device 2, the calibrator, and the pressure pump is performed while checking an operation manual printed on paper at a site in a plant, for example. The calibration procedure is performed by sequentially performing measurement at five points in an ascending and descending manner with a step of 50% such that 0%→50%→100%→50%→0% in a measurement range of the field device 2 or at nine points in an ascending and descending manner with a step of 25%, for example. The calibration procedure itself is displayed to the calibrator, for example. The maintenance operator writes the calibration result in a maintenance record and transfers the measurement data from the calibrator to a universal serial bus (USB) memory or the like to save data. The maintenance operator checks the error of the field device 2 on the basis of the saved measurement data and performs adjustment using a tool for adjusting and setting the field device 2.

On the other hand, when the maintenance operation support device 1 of the present embodiment is used, the maintenance operation support device 1 and the calibrator are connected via USB communication. Moreover, the maintenance operation support device 1 and the field device 2 are connected via field communication. The maintenance operation support device 1 displays operation items corresponding to the operation procedure to the maintenance operator to support calibration of the maintenance operator.

For example, first, the maintenance operation support device 1 displays operation items indicating a method of a preparation operation before calibration such as connection of the maintenance operation support device 1 the field device 2, the calibrator, and the pressure pump. The maintenance operation support device 1 detects completion of the preparation operation, for example, by acquiring parameters from the field device 2 and displays the next operation item. Subsequently, the maintenance operation support device 1 performs management of operation procedures such as display of operation procedures of operation items of calibration before adjustment, operation items of adjustment of the field device 2 using the setting tool 19, and operation items of calibration after adjustment and performs recording of operation items such as acquisition or recording of data of the field device 2 or the calibrator. In this way, the maintenance operation support device 1 can inform an operator of the operation procedure of calibration or adjustment of the field device 2 to reduce a mistake in the operation procedure to thereby support improvement in the efficiency of the maintenance operation.

In FIG. 15, a case in which the field device 2 performs calibration of the differential pressure transmitter using the maintenance operation support device 1 has been described. However, the use of the maintenance operation support device 1 is limited to this. For example, the maintenance operation support device 1 may be used for measuring a resistance or the like of a pressure switch when the field device 2 is a pressure switch, checking operations and adjusting input and output values when the field device 2 is a vacuum converter, performing loop checking when the field device 2 is a transmitter, and checking and adjusting input instructions of a recorder and a controller. The maintenance operation support device 1 can inform the operator of an operation procedure corresponding to maintenance operations of various facilities to improve the operation efficiency.

Next, another example of an operation procedure edited by the maintenance operation support device 1 will be described with reference to FIG. 16. FIG. 16 is a diagram illustrating another example of an operation procedure edited by the maintenance operation support device 1 according to the embodiment.

FIG. 16 illustrates an operation procedure as a list instead of the flowchart illustrated in FIG. 12 and the like. When processing branches according to determinations, for example, a flowchart allows a maintenance operator to easily understand the flow of the operation procedure. However, when an operation procedure in which operation items are performed sequentially is displayed as a list, since the number of pieces of information expressed by a table increases, such a list allows a maintenance operator to easily understand the operation procedure, for example.

When an operation procedure is displayed as a list and a flowchart, it is easy to integrate a plurality of operation items into one operation item and subdivide one operation item into more detailed sub-steps. As described above, for a maintenance operator having a high skill, since it is less necessary to display detailed operation items, operation items with a broad degree of detail only may be displayed, for example. On the other hand, for a maintenance operator having low skill, since it is highly necessary to display a detailed operation item, a detailed operation item is displayed. In this manner, it is easy to change a display method according to the skill of the maintenance operator.

As described above, the maintenance operation support device of the present embodiment includes a procedure information outputter configured to output procedure information representing an operation procedure of maintenance operations for a facility, the procedure information being obtained by combining action definition information for defining actions of a setting tool that adjusts or sets the facility and operation definition information for defining operations to be instructed to a maintenance operator who performs maintenance operations for the facility. Due to this, the maintenance operator is informed of operation procedures corresponding to various maintenance operations of facilities. Therefore, it is possible to reduce a mistake in the operation procedure of the maintenance operator and to support improvement in the efficiency of maintenance operations.

The maintenance operation support device described above may be an arbitrary device having the above-described functions and may be realized as a system which is made up of a combination of a plurality of devices and in which respective devices are communicably connected, for example. Moreover, the maintenance operation support device may be realized as a portion of the functions of other devices connected by a network.

For example, any one or more of the respective functions of the action definition information acquirer 11, the action definition information storage 11a, the operation definition information acquirer 12, the operation definition information storage 12a, the procedure information generator 13, the procedure information acquirer 14, the procedure information outputter 15, the executor 16, the communicator 17, the communicator 18, and the setting tool 19 included in the maintenance operation support device 1 described in FIG. 1 may be realized in other devices communicably connected to the maintenance operation support device 1. For example, the setting tool 19 may be realized as a dedicated tool (device).

In the maintenance operation support device described above, a case in which the facility which is adjusted or set by the setting tool is a field device present in a plant has been described. However, the facility which is adjusted by the setting tool is not limited to this. The facility which is adjusted by the setting tool may be a building facility, a water supply facility, a gas facility, an electrical facility, or the like, for example. That is, the maintenance operation support device can be used in these fields by combining pieces of action definition information that defines operations of the setting tool that adjusts these facilities to output procedure information.

A maintenance operation support method of the present embodiment includes a procedure information output step of outputting procedure information representing an operation procedure of maintenance operations for facilities, the procedure information being obtained by combining the action definition information that defines operations of a setting tool that adjusts or sets facilities and the operation definition information that defines operations to be instructed to a maintenance operator who performs maintenance operations for the facilities. Therefore, it is possible to reduce mistake in the operation procedure of the maintenance operator and to support improvement in the efficiency of maintenance operations. The maintenance operation support method of the present embodiment may include an action definition information acquisition step, an operation definition information acquisition step, a procedure information generation step, a procedure information acquisition step, and a displaying step corresponding to an action definition information acquirer, an operation definition information acquirer, a procedure information generator, a procedure information acquirer, and a display device of the maintenance operation support device. These respective steps may be executed in an arbitrary procedure.

Moreover, the above-described various processes of the present embodiment may be performed by recording a program for realizing the functions of the devices described in the present embodiment on a computer-readable recording medium and causing a computer system to read and execute the program recorded on the recording medium. Here, the "computer system" as used herein may include hardware such as OS and peripherals. Moreover, the "computer system" may include a homepage providing environment (or a homepage display environment) if it uses a WWW system. Moreover, the "computer-readable recording medium" veritable nonvolatile memory such as a flexible disk, a magneto-optical disk, a ROM, or a flash memory, a portable medium such as a CD-ROM and a storage device such as a hard disk included in a computer system.

Furthermore, the "computer-readable recording medium" is one that stores programs for a predetermined period s as a volatile memory (for example, DRAM: Dynamic Random Access Memory) provided inside a computer system that serves as a server or a client when a program is transmitted via a network such as the Internet and a communication line such as a telephone line. Moreover, the program may be transmitted from a computer system storing the program in a storage device or the like to another computer system through a transmission medium or through transmission waves in a transmission medium. Here, the "transmission medium" that transmits the program is a medium having a function of transmitting information, such as a network (communication network) such as the Internet and a communication line (communication wire) such as a telephone line. Moreover, the program may realize a part of the above-described functions. Furthermore, the program may be a so-called differential file (differential program) which can realize the above-described functions through a combination with a program that is recorded in advance in a computer system.

As used herein, the following directional terms "front, back, above, downward, right, left, vertical, horizontal, below, transverse, row and column" as well as any other similar directional terms refer to those instructions of a device equipped with the present invention. Accordingly, these terms, as utilized to describe the present invention should be interpreted relative a device equipped with the present invention.

The term "configured" is used to describe a component, unit or part of a device includes hardware and/or software that is constructed and/or programmed to carry out the desired function.

Moreover, terms that are expressed as "means-plus function" in the claims should include any structure that can be utilized to carry out the function of that part of the present invention.

The term "unit" is used to describe a component, unit or part of a hardware and/or software that is constructed and/or programmed to carry out the desired function. Typical examples of the hardware may include, but are not limited to, a device and a circuit.

While preferred embodiments of the present invention have been described and illustrated above, it should be understood that these are examples of the present invention and are not to be considered as limiting. Additions, substitutions, and other modifications can be made without departing from the scope of the present invention. Accordingly, the present invention is not to be considered as being limited by the foregoing description, and is only limited by the scope of the claims.

What is claimed is:

1. A maintenance operation support device comprising:
   a processor configured to execute a maintenance operation support program to implement:
   an action definition information acquirer configured to acquire action definition information for defining actions of a setting tool that adjusts or sets a facility;
   an operation definition information acquirer configured to acquire operation definition information for defining operations to be instructed to a maintenance operator who performs maintenance operations for the facility;
   a procedure information generator configured to generate procedure information representing an operation procedure of the maintenance operations for the facility; and
   a procedure information outputter configured to output the procedure information generated by the procedure information generator,
   wherein the procedure information generator is configured to combine the action definition information acquired by the action definition information acquirer and the operation definition information acquired by the operation definition information acquirer to generate the procedure information,
   wherein the procedure information outputter is configured to output the procedure information while changing a degree of detail of the operation procedure in accordance with a level of the maintenance operator,
   wherein the degree of detail represents a detailedness of a content of operation items included in the operation procedure,
   wherein the procedure information generator is configured to generate the procedure information representing detailed or simplified operation items in accordance with a skill of the maintenance operator,
   wherein the procedure information outputter is configured to change the degree of detail of the operation items according to an explicit instruction or setting by the maintenance operator,
   wherein the operation items included in the operation procedure comprise an operation in a pre-processing step that is performed before the maintenance operations, an operation in an execution step of the maintenance operations, and an operation in a post-processing step that is performed after the maintenance operations,
   wherein the procedure information outputter displays the operation in the pre-processing step, the operation in the execution step, and the operation in the post-processing step collectively, and
   wherein the procedure information outputter is configured to output the procedure information by switching a flowchart in which the operation items are connected by connectors or a list comprising an operation content and operation target for each of the operation items.

2. The maintenance operation support device according to claim 1,
   wherein the processor is configured to execute the maintenance operation support program to further implement a procedure information acquirer configured to acquire the procedure information, and
   wherein the procedure information outputter is configured to output the procedure information when the procedure information has been acquired by the procedure information acquirer.

3. The maintenance operation support device according to claim 1, wherein the procedure information outputter is configured to output the procedure information together with a progress state of the operation procedure.

4. The maintenance operation support device according to claim 1,
   wherein the procedure information outputter is configured to output the procedure information as display data for displaying the operation procedure.

5. The maintenance operation support device according to claim 4,
   wherein the display data comprises information for displaying an operation item selection area and an operation procedure editing area,
   wherein an operation item related to the action definition information and an operation item related to the operation definition information are displayed selectably in the operation item selection area,
   wherein at least one selected operation item is displayed arrangeably in the operation procedure editing area, and
   wherein the procedure information outputter is configured to output the operation procedure generated based on the operation item arranged in the operation procedure editing area.

6. The maintenance operation support device according to claim 5,
   wherein the display data comprises information for displaying a connection area in which a connector to be connected to the operation item arranged in the operation procedure editing area is displayed selectably, and
   wherein in the operation procedure editing area, the connector which has been selected is displayed arrangeably, and the connector and the operation item are connectable to each other.

7. The maintenance operation support device according to claim 4, further comprising:
   a display device configured to display the display data output by the procedure information outputter.

8. The maintenance operation support device according to claim 1,
   wherein the procedure information outputter is configured to output the procedure information as execution data for executing the maintenance operations in accordance with the operation procedure.

9. The maintenance operation support device according to claim 8, further comprising:

an executor configured to execute the maintenance operations in accordance with the operation procedure based on the execution data output by the procedure information outputter.

10. The maintenance operation support device according to claim 1,
wherein the operation definition information is information for defining an operation instruction for prompting the maintenance operator to input information.

11. The maintenance operation support device according to claim 1, further comprising:
the setting tool configured to adjust or set a field device installed in a plant.

12. The maintenance operation support device according to claim 11,
wherein the setting tool comprises:
a parameter setter configured to set a parameter of the field device;
a parameter adjuster configured to adjust the parameter of the field device;
a test supporter configured to support the maintenance operations of the field device; and
a report creator configured to create a report based on at least one of a result of the maintenance operations, a progress midway through the maintenance operations, a progress midway during interruption of the maintenance operations, and information related to the maintenance operations.

13. The maintenance operation support device according to claim 12,
wherein the information related to the maintenance operation comprises at least one of information such as a specification, a type, a serial number of the field device used in the maintenance operation, and stock information of consumables used in the maintenance operation.

14. A maintenance operation support method comprising:
acquiring, by an action definition information acquirer, action definition information for defining actions of a setting tool that adjusts or sets a facility;
acquiring, by an operation definition information acquirer, operation definition information for defining operations to be instructed to a maintenance operator who performs maintenance operations for the facility;
generating, by a procedure information generator, procedure information representing an operation procedure of the maintenance operations for the facility;
outputting, by a procedure information outputter, the procedure information generated by the procedure information generator; and
combining, by the procedure information generator, the action definition information acquired by the action definition information acquirer and the operation definition information acquired by the operation definition information acquirer to generate the procedure information,
outputting, by the procedure information outputter, the procedure information while changing a degree of detail of the operation procedure in accordance with a level of the maintenance operator,
wherein the degree of detail represents a detailedness of a content of operation items included in the operation procedure,
wherein the maintenance operation support method further comprises:
generating, by the procedure information generator, the procedure information representing detailed or simplified operation items in accordance with a skill of the maintenance operator; and
changing, by the procedure information outputter, the degree of detail of the operation items according to an explicit instruction or setting by the maintenance operator,
wherein the operation items included in the operation procedure comprise an operation in a pre-processing step that is performed before the maintenance operations, an operation in an execution step of the maintenance operations, and an operation in a post-processing step that is performed after the maintenance operations, and
wherein the maintenance operation support method further comprises:
displaying, by the procedure information outputter, the operation in the pre-processing step, the operation in the execution step, and the operation in the post-processing step collectively; and
outputting, by the procedure information outputter, the procedure information by switching a flowchart in which the operation items are connected by connectors or a list comprising an operation content and operation target for each of the operation items.

15. A non-transitory computer readable storage medium storing one or more maintenance operation support programs configured for execution by a computer, the one or more maintenance operation support programs comprising instructions for:
acquiring, by an action definition information acquirer, action definition information for defining actions of a setting tool that adjusts or sets a facility;
acquiring, by an operation definition information acquirer, operation definition information for defining operations to be instructed to a maintenance operator who performs maintenance operations for the facility;
generating, by a procedure information generator, procedure information representing an operation procedure of the maintenance operations for the facility;
outputting, by a procedure information outputter, the procedure information generated by the procedure information generator; and
combining, by the procedure information generator, the action definition information acquired by the action definition information acquirer and the operation definition information acquired by the operation definition information acquirer to generate the procedure information,
outputting, by the procedure information outputter, the procedure information while changing a degree of detail of the operation procedure in accordance with a level of the maintenance operator,
wherein the degree of detail represents a detailedness of a content of operation items included in the operation procedure,
wherein the one or more maintenance operation support programs further comprises instructions for:
generating, by the procedure information generator, the procedure information representing detailed or simplified operation items in accordance with a skill of the maintenance operator; and
changing, by the procedure information outputter, the degree of detail of the operation items according to an explicit instruction or setting by the maintenance operator,
wherein the operation items included in the operation procedure comprise an operation in a pre-processing step that is performed before the maintenance operations, an operation in an execution step of the maintenance operations, and an operation in a post-processing step that is performed after the maintenance operations, and wherein the one or more maintenance operation support programs further comprises instructions for:

displaying, by the procedure information outputter, the operation in the pre-processing step, the operation in the execution step, and the operation in the post-processing step collectively; and outputting, by the procedure information outputter, the procedure information by switching a flowchart in which the operation items are connected by connectors or a list comprising an operation content and operation target for each of the operation items.

* * * * *